Figure 1:
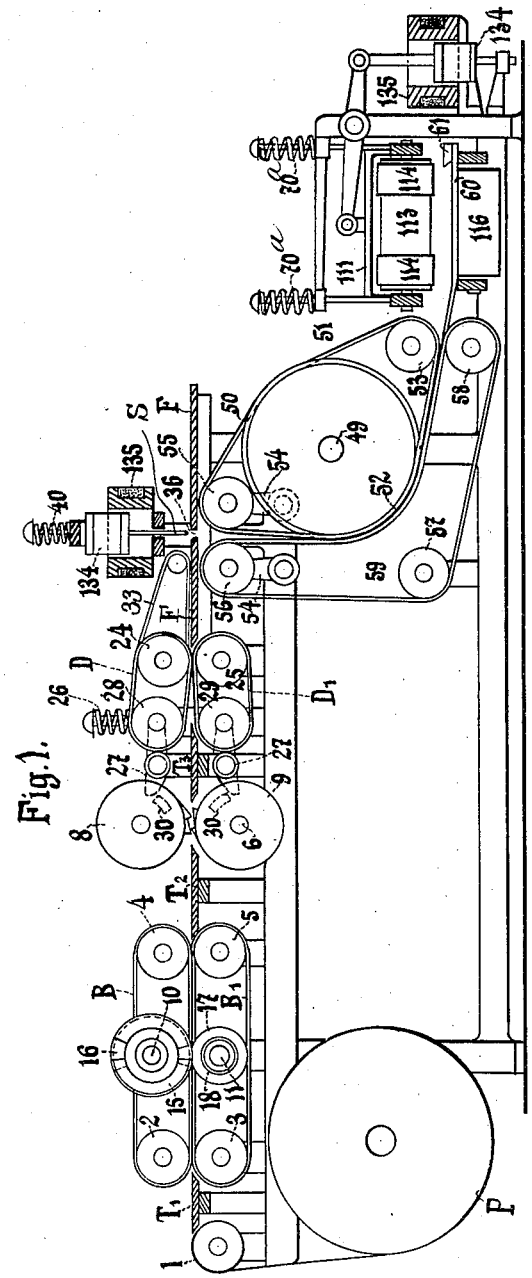

F. HEPP.
MACHINE FOR MAKING PAPER BAGS.
APPLICATION FILED FEB. 17, 1909.

1,070,341.

Patented Aug. 12, 1913.

8 SHEETS—SHEET 1.

WITNESSES
C. E. Holske
G. H. Emslie

INVENTOR
Friedrich Hepp

F. HEPP.
MACHINE FOR MAKING PAPER BAGS.
APPLICATION FILED FEB. 17, 1909.
1,070,341.
Patented Aug. 12, 1913.
8 SHEETS—SHEET 2.
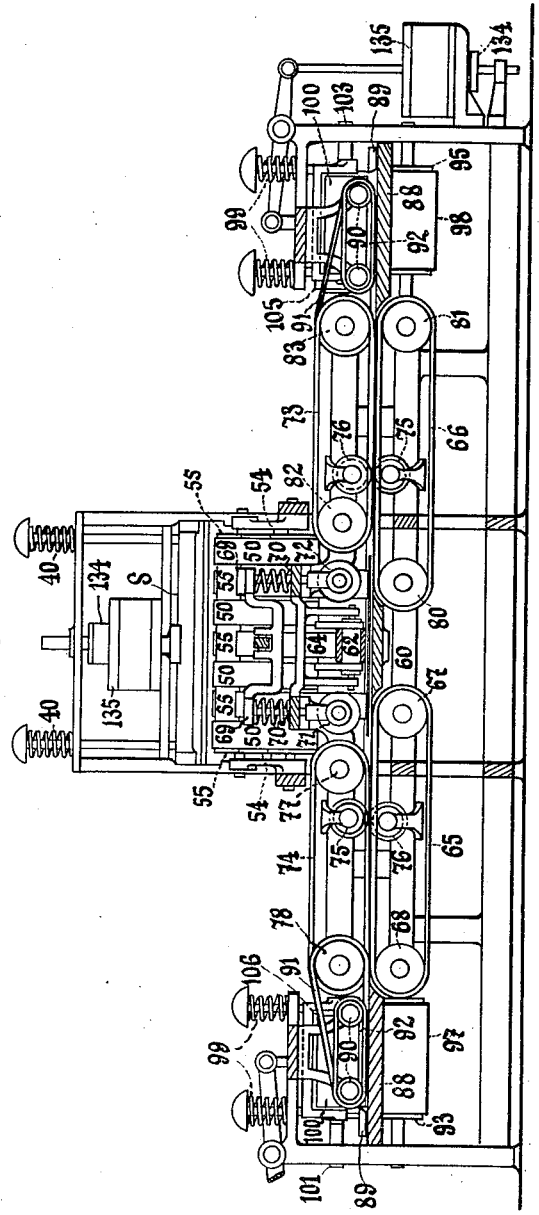
WITNESSES
INVENTOR

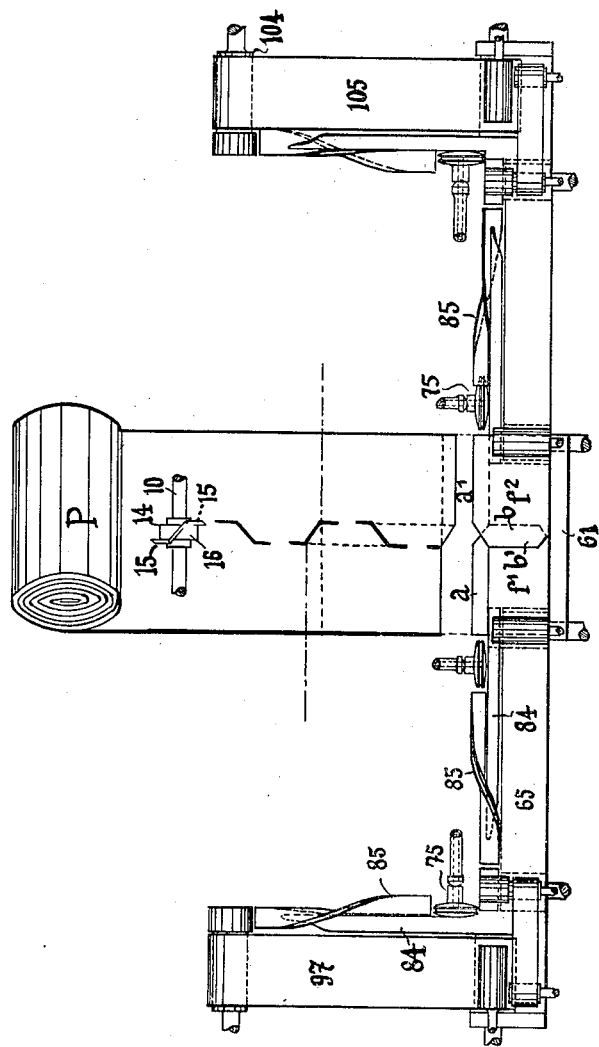

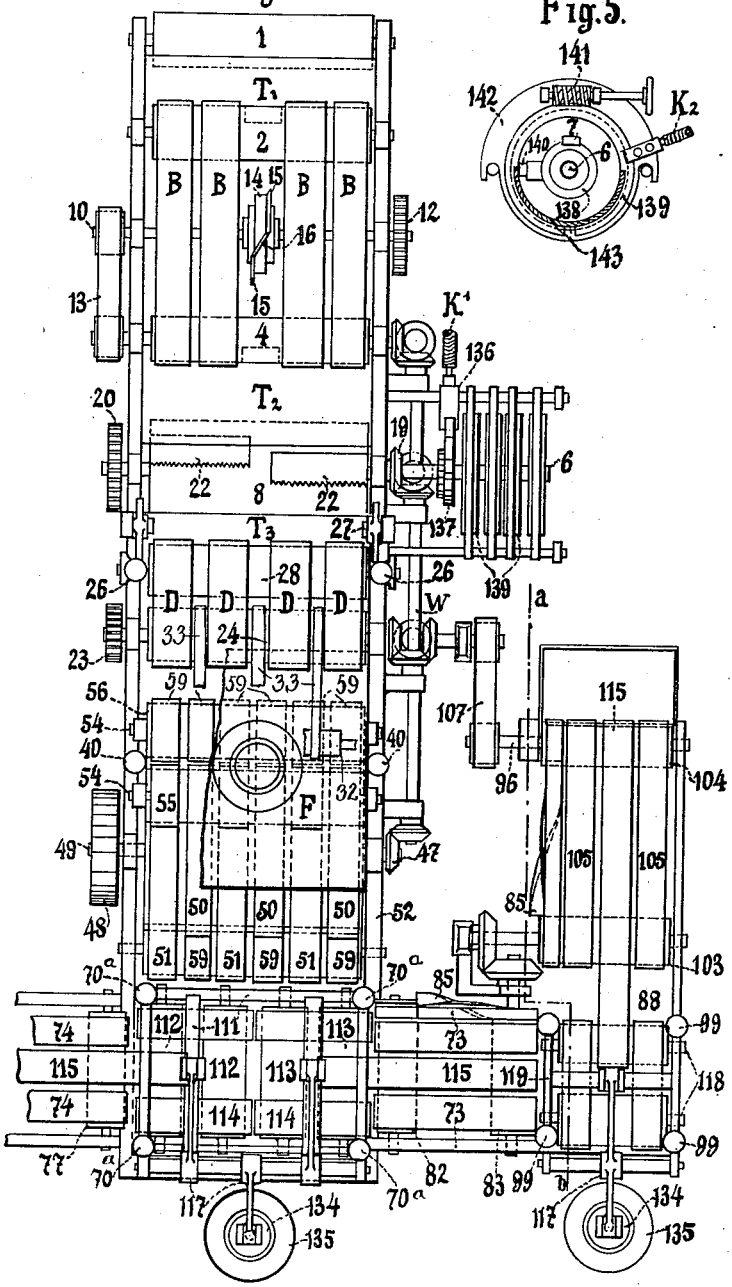

F. HEPP.
MACHINE FOR MAKING PAPER BAGS.
APPLICATION FILED FEB. 17, 1909.
1,070,341.
Patented Aug. 12, 1913.
8 SHEETS—SHEET 5.
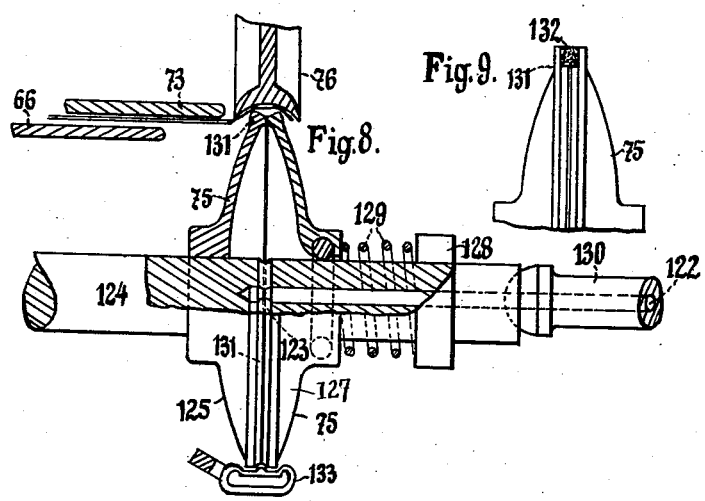
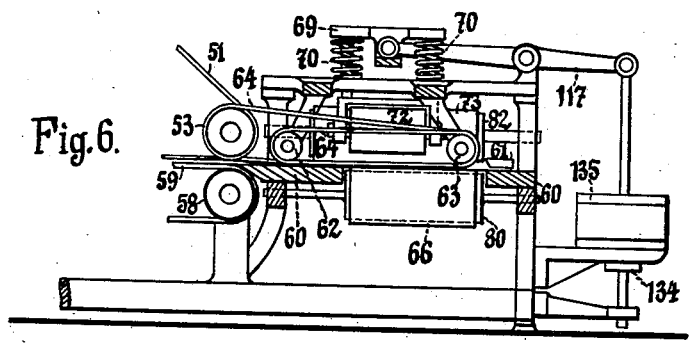
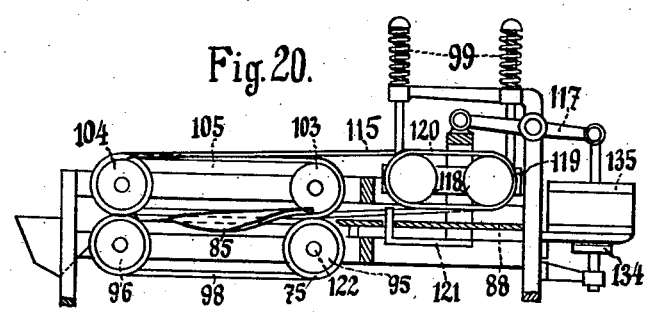
WITNESSES
INVENTOR
Friedrich Hepp

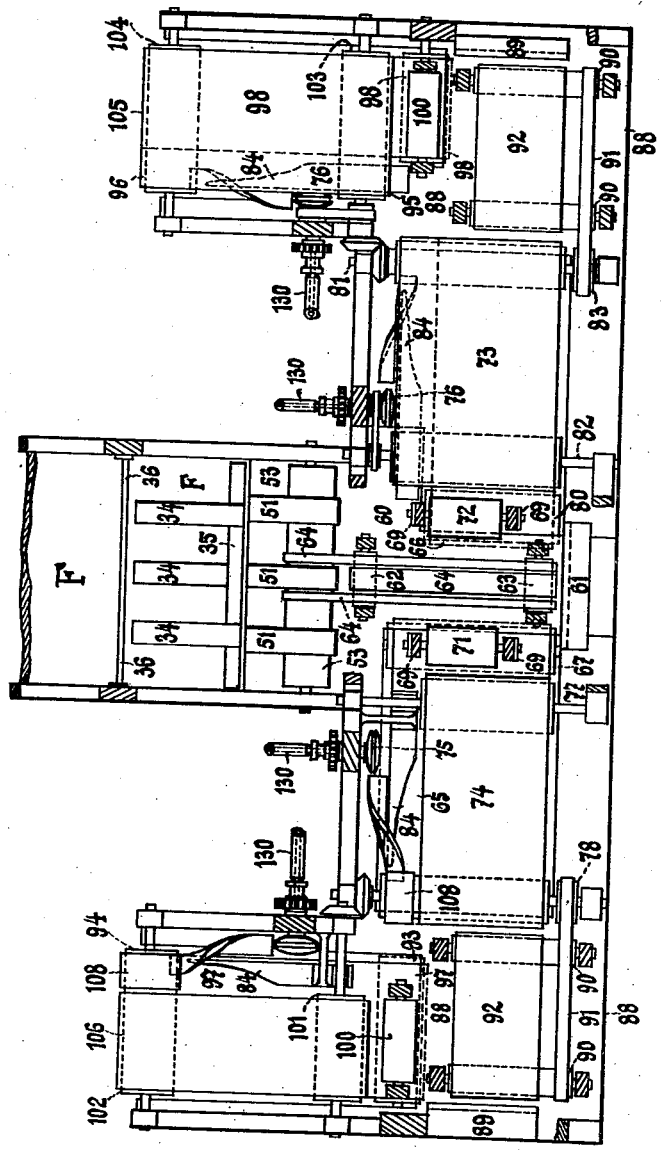

F. HEPP.
MACHINE FOR MAKING PAPER BAGS.
APPLICATION FILED FEB. 17, 1909.
1,070,341.
Patented Aug. 12, 1913.
8 SHEETS—SHEET 7.
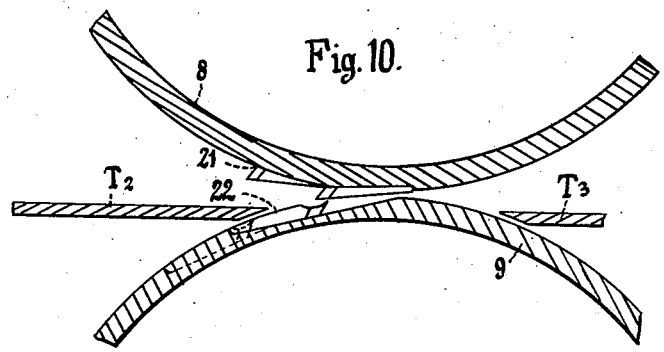
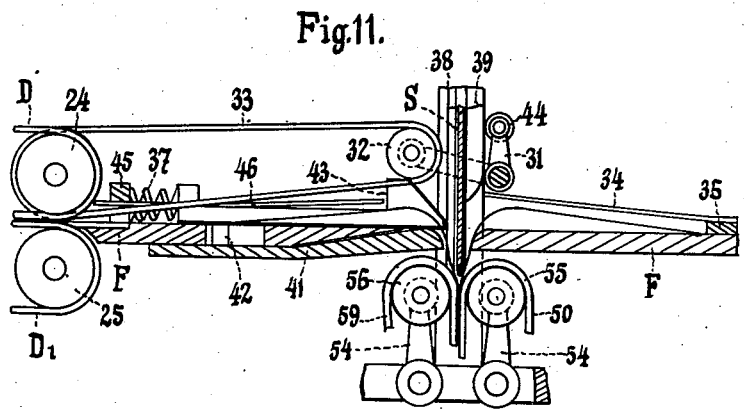
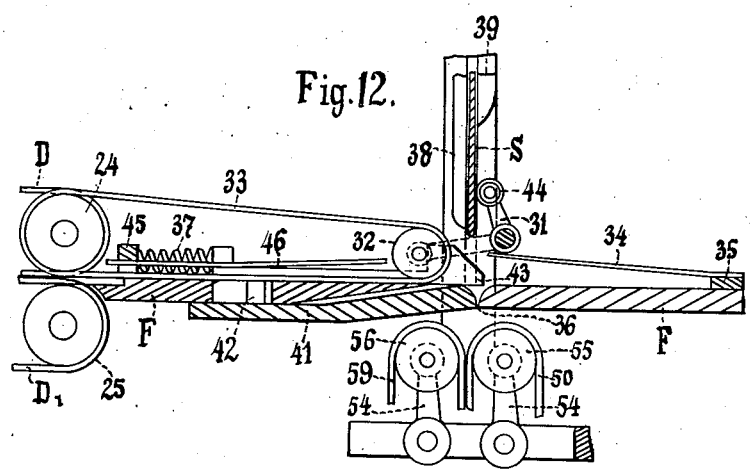
WITNESSES
C. E. Holske
G. H. Emilie
INVENTOR
Friedrich Hepp

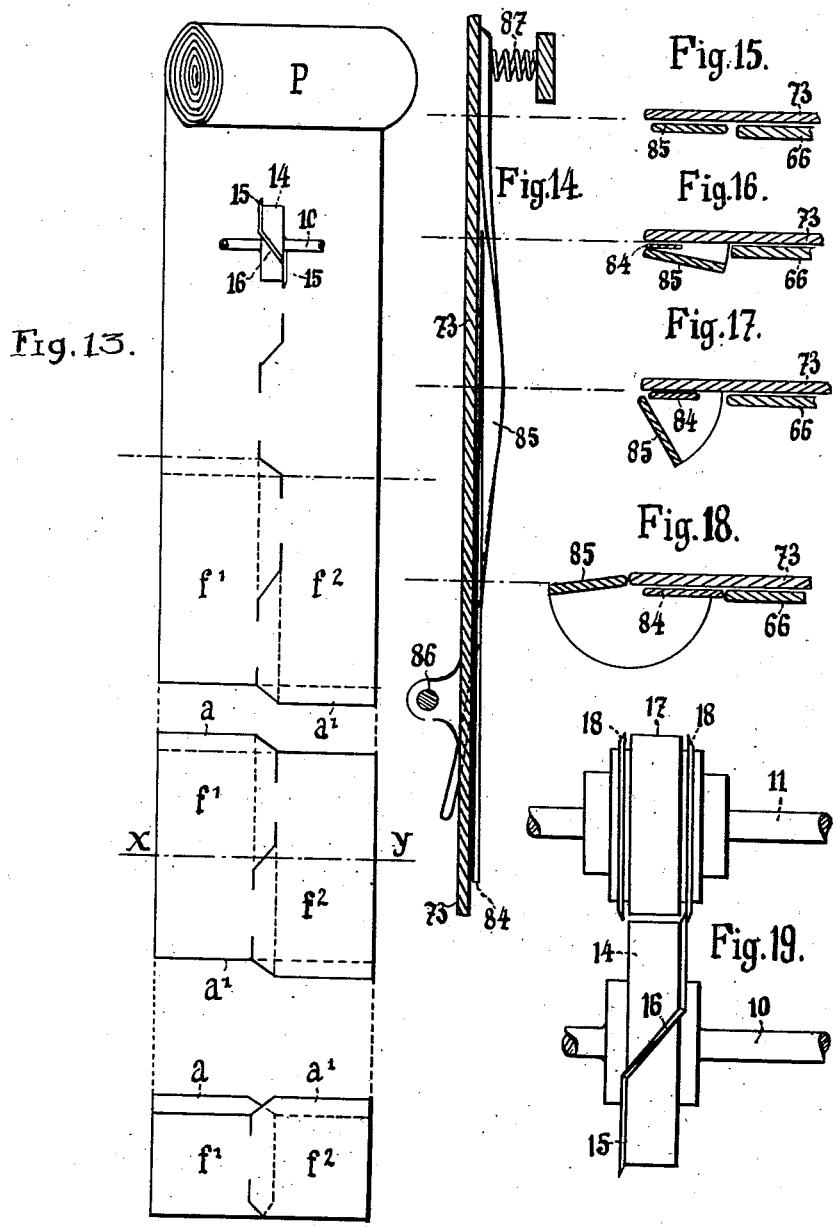

UNITED STATES PATENT OFFICE.

FRIEDRICH HEPP, OF TEMPELHOF, NEAR BERLIN, GERMANY.

MACHINE FOR MAKING PAPER BAGS.

1,070,341. Specification of Letters Patent. Patented Aug. 12, 1913.

Application filed February 17, 1909. Serial No. 478,510.

*To all whom it may concern:*

Be it known that I, FRIEDRICH HEPP, a subject of the Austro-Hungarian Emperor, residing at Tempelhof, near Berlin, in the Kingdom of Prussia and German Empire, have invented a new and useful Improved Machine for Making Paper Bags, of which the following is a specification.

My invention relates to a machine for making flat bags of both a rectangular and triangular form.

The machine is adapted to operate in such a manner that the blanks, after they have been folded, for example about the middle, or diagonally, change their direction of movement at an angle depending on the form of the bag, in order to be conveyed to the apparatus for closing their laps. The advantage of this arrangement is that, while the laps are being folded and stuck, the blanks are being moved continuously, in their own plane, while the apparatus serving to close the laps can be arranged suitably distributed behind each other and stationary in regard to the blanks. By this means the blanks, which mostly consist of very thin paper are not acted on over a larger area or distance simultaneously and as a consequence creases are avoided. Further, the time lost and additional work entailed, when the blanks periodically stop, in order to be acted upon by moving apparatus, as in existing machines are saved. By using this improved machine the production of the bags can be carried out, not only by taking the blanks separately from a heap, but also by cutting said blanks from a strip of paper continuously fed to the machine, which strip in the case of rectangular bags is divided into separate blanks by a longitudinal middle cut, by which the bottom laps are simultaneously formed and these blanks can be led off, at an angle, in opposite directions, to the apparatus for closing the laps, so that a double production is obtained.

In the accompanying drawing a machine for making rectangular paper bags is shown by way of example.

Figure 1 shows a longitudinal section of the middle part of the machine, Fig. 2, a transverse section of the entire machine, Fig. 3, a diagrammatic plan, Fig. 4, a plan of the middle of one side part of the machine, Fig. 5, a section of the current distributer, Fig. 6, a longitudinal part section of another construction of the machine, and Fig. 7, a plan of the second construction partly in section, while Figs. 8-19 represent details, and Fig. 20, a section on the line $a$—$b$ in Fig. 4.

The paper strip passes from the roll P over the guide roll 1 and table $T^1$ and is taken up by the endless belts B, $B^1$, which are driven by the rolls 4, 5 from the shaft W (Fig. 4). By said endless belts the strip is moved over the table $T^2$ and between the cutting rolls 8, 9, then over the table $T^3$ to the endless belts D, $D^1$. Between the belts B, $B^1$ (Fig. 4) or behind the cutting rolls 8, 9 the longitudinal cutting device 14 is provided, which consists of segmental or diagonal knife blades 15, 16, adapted to operate in connection with the circular blades 18 and roll 17 on the shaft 11 (Figs. 1 and 19). The side blades 15 of the cutter 14, whose dimensions are chosen according to the size of the paper bag to be made, project beyond the circumference of the middle portion and have intersections so that the paper strip is not entirely divided by the cut.

From the paper strip provided with the longitudinal and prismatically interrupted cut, which is interrupted by the spaces in the knife blades 15 (Fig. 13), a double blank $f^1$, $f^2$ is cut off by the rotary cutters 8 and 9, (Fig. 10) driven from the shaft W, which, during each rotation, cut said paper strip twice transversely at a distance apart equal to the gumming lap $a$, $a^1$ (Fig. 13). The cutting rolls, which are connected with each other by the spur-wheels 20 are driven by a bevel-wheel 19 (Fig. 4), which is exchangeable according to the size of the paper bag to be made. On the circumference of the cutting rolls 8, 9 are provided flat toothed knife blades 21, 22, (Fig. 4), which are not in a continuous line across the circumference, but one somewhat behind the other. The cutting edges of these blades project beyond the circumference of the top roll, while they are at the same level with the circumference of the bottom roll, so that there is no space between the circumference of the roll and the top of the table $T^3$ (Fig. 10). Endless belts D, $D^1$, which are driven at a higher speed than the paper strip, are carried at one end by the rolls 24, 25, and are in driving connection with each other by means of the spur-wheels 23, while at their other ends they are carried by the rolls 28, 29, journaled in the levers 27, which are kept apart by the springs 26 (Figs. 1 and 4). As soon as the points of the corresponding knife blades 21, 22 engage with each other the projections 30 at the sides of the rolls 8, 9 strike against the free ends of the levers 27, and, consequently, the belts D, D¹, carried by the rolls 28, 29, are brought closer together, so that they catch the separated blanks $f^1$, $f^2$ and convey the same, owing to their different speeds, at suitable intervals to the folding device F. Over the folding plate F (Figs. 11 and 12) belts 33 are provided, which are carried by the driven roll 24 and by the roll 32 journaled in the lever 31. Said belts 33 glide over the surface of the table F and convey the blanks $f^1$, $f^2$ to the stop 35, against which their front edges are pressed.

In order to prevent the blank being caught by the slot 36 in the plate F, when passing thereover, a slide acted on by springs 37 is provided, which on the blade S descending is pressed aside. On both ends of the folding blade S there are ribs 38, 39. As soon as the double blank $f^1$, $f^2$ has been pressed by the belts 33 against the stop 35, the folding plate S, which is acted on by the springs 40, is moved by an electromagnet (Figs. 4 and 5), and its lower rounded edge arrives at the level of the slot in the folding plate F. When the blade S descends the ribs 38, whose ends are beveled off, come into engagement with slides 43, connected by pins 42 with a common slide 41, which slide is moved so as to open the slot 36 (Fig. 11). At the same time the ends of the bell-crank levers 31 provided with rolls 44 are pressed aside by the ribs 39, so that the roll 32 is raised and the belts 33 are moved away from the surface of the folding plate and the double blank $f^1$, $f^2$ caught by the folding blade S is released. Between the belts 33 there are rods 46 secured to a rail 45 arranged across the folding plate (Figs. 11 and 12), in order to prevent the blank being bent by the blade S from coming into engagement with the continuously moving belts 33 then raised above said rods 46.

Underneath the folding plate F is provided a shaft 49, which is connected with the shaft W by bevel-wheels 47 and is driven by the pulley 48. On said shaft 49 is fastened the drum 52, by which the belts 50 and 51 are operated. (Fig. 1.) Whereas the belts 50 and 51 which pass around the roll 55 journaled in the levers 54 and the roll 53 respectively are driven direct by the drum 52, the belts 59, which also pass around similar rolls 56, carried by the levers 54, and around rolls 57 and 58 are moved by friction against the belts 50, 51. The double blank $f^1$, $f^2$, on the middle or folding line of which the folding rail S descends is pushed in doubled form through the slot 36 into engagement with the belts 50 and 59 (Fig. 11), by which it is sharply folded and then delivered to the turning plate 60. Over said plate are provided the guide belts 64, which operate in connection with the stop 61 (Figs. 6 and 7) and pass around the driving roll 53 and the rolls 62, 63, and over the surface of the plate 60. In this construction shown in Figs. 2, 6 and 7 are provided on both sides of the double blank $f^1$, $f^2$, whose folding edge presses against the stop 61, the belts 65, 66, which rotate in opposite directions and are situated at the same level as the surface of the turning plates (Fig. 2). Over the rolls 67, 80, by which the belts 65, 66 are carried, are situated the separating or tearing rolls 71, 72, which are connected together by the frame 69 (Figs. 2 and 6) and supported by the springs 70. These rolls 71 and 72 are lowered simultaneously by an electromagnet. As soon as the folded double blank $f^1$, $f^2$, passing over the turning plate 60, arrives at the stop 61 (Fig. 6), the tearing rolls 71, 72 are pressed against the belts 65, 66 or the like, which pass around the rolls 67, 80, the double blank being thus separated along the middle cut, whereupon the separate blanks $f^1$, $f^2$ come into engagement with the belts 73, 74 which operate in connection with the folding belts 66, 65 and are carried by the rolls 77, 78 and 82, 83 (Figs. 2, 6 and 7).

Fig. 3 shows diagrammatically the further manipulation of the blanks $f^1$, $f^2$. The separate blanks $f^1$, $f^2$ transported away in opposite directions on each side of the turning plate 60 are moved further in such a manner, that the side laps $a$, $a^1$ come into position for the application of the gum, which is effected by a rotating disk nozzle 75 (Fig. 8), to which the gum or the like is fed. Said disk operates in connection with a grooved disk 76 in such a manner that the surface of the lap $a$, $a^1$ directed toward the nozzle 75 can come into contact with the circumference of said disk nozzle. Whereas the laps $a$ of the blanks $f^1$, passing toward the left (Fig. 3) are bent upward, the laps $a^1$ of the blanks $f^2$, passing toward the right, are bent downward, gum being applied to the corresponding inner side in each case. In the first case the folding belt 65, carried by the lower rolls 67, 68, is broader than the upper belt 74 (Figs. 2, 3, 6 and 7) carried by the rolls 77, 78, while in the second case (on the right side) the broader folding belt 73, carried by the rolls 82, 93, is over the narrower belt 66, carried by the rolls 80, 81. Above or below that part of the folding belts 65, 73 not in contact with the respective belts 74, 66 a longitudinal blade 84 is so provided that its narrow ends lightly and resiliently touch the belts 65, 73 (Figs. 14–18, 3 and 7). At the side of each of the belts 65, 73 there is provided a rail 85, whose inner surface is longitudinally twisted through 180°. Said rail begins at the same level with the operative surface of the folding belt, while its other end is twisted over to touch said surface. The front end of the rail 85 is preferably jointed to a fixed bolt 86 (Fig. 14), while the opposite end, which is twisted over the surface of the belt, is pressed by a spring 87, or the like, on said belt.

The separate blanks $f^1$, $f^2$, whose laps $a$, $a^1$ project over the edges of the folding belts 65, 73, are pressed by the belts 74, 66 against the folding belts 65, 73 and are advanced under or over the surface of the fixed blades 84. The inner surface of the laps, to which the gum is applied by any suitable gumming device such as the disk shown in Figs. 8 and 9, glide over the inner surface of the longitudinally twisted rails 85 and are accordingly folded around the longitudinal edge of the blades 84. The folded laps $a$, $a^1$ are pressed by the inner smooth surface of the rail 85 against the body portion of the blanks over or under the blades 84, being thus sharply folded and attached. The blanks $f^1$, $f^2$, after their longitudinal edge has been closed, are transported over the plates to the turning plates 88, provided on each side of the machine, and are advanced to the stops 89 by the belts 92, carried by the rolls 90 and driven from the rolls 78, 83 by means of the belt 91. Said stops 89 retain the blanks in position, whereupon the latter are moved away at an angle corresponding to the form of the paper bag by means of the rolls 100 (Figs. 2 and 7). The rolls 100 are adapted to be moved electromagnetically and operate in connection with the folding belt 97 or transport belts 98, carried by the rolls 93, 94 and 95, 96 respectively. The blanks $f^1$, $f^2$ are then brought between the folding belts 97, 105 and transport belts 98, 106, carried by the bottom rolls 93, 94 (95, 96) and the top rolls 101, 102 and 103, 104 respectively, whereupon the laps $b$, $b^1$ provided for closing the bottom of the bags are gummed and attached in exactly the same way described above in connection with the side laps. The finished bags are then delivered out of the machine by the rolls 94, 102 and 96, 104, driven by the belts 107 from the shaft W. In order to obtain a good attachment of the laps elastic sleeves 108 are arranged at the ends of the rolls 78, 81 and 96, 102 carrying the narrower belts, which sleeves firmly press the laps $a$, $a^1$ and $b$, $b^1$ on the body of the blanks, in this way obtaining a good attachment.

In a second construction of the turning devices shown in Figs. 1, 4 and 20 are provided over the turning plates 60 in a frame 119, or the like, belts 114 carried by the rolls 112, 113, rotating in opposite directions. These belts are adjusted vertically against the tension of the spring 70$^a$ by an electromagnet or eccentric from the shaft 6. The belts 114 are preferably moved by the belts 115, carried by the rolls 77, 78 or 82, 83, and by the rolls 112 or 113, in which case the belts 73 and 74 can be divided (Fig. 4). Underneath the plate 60 are disposed the resiliently journaled tearing rolls 116, which correspond with the rolls 112, 113, carrying the belts 114 and projecting beyond the surface of the plates, which rolls 116 operate with the oppositely moved tearing belts 114, in such a manner, that the double blanks passing over the plate 60 toward the stop 61 are seized, divided and led off.

Fig. 20 shows a section on the line $a-b$ of Fig. 4. Over the turning plate 88 pairs of rolls 118 are situated, which are acted on by the springs 99, are vertically guided and adapted to be operated by electromagnets through the agency of a lever 117. These rolls are journaled in the frame 119. Over the rolls 118 are moved the belts 120, which are each kept in motion by one of the belts 115, carried by the rolls 101, 102, 103, 104 and the rolls 118. In order to prevent the separate blanks from getting into a crooked position, when turning the corner, a vertically reciprocated rail 121 is provided in each case, which passes through the corresponding plates 88 and is fastened to the frame 119. The side surfaces of the rail 121 projecting over the plate 88 or its longitudinal edges serve as a guide for the blanks.

Fig. 8 shows one of the gumming devices arranged above or below the blank according as the top or bottom surface of the lap has to be gummed. Said device consists of a shaft 124 having a central channel 122 and radial channels 123, on which shaft there is secured a disk 125 adjacent to whose inner edge there is a second disk 127 adapted to rotate on the shaft 124. This disk 127 is pressed against 125 by a spring 129 adjustable by means of the ring 128. The gum or the like is fed to the shaft 124 through a pipe 130, which projects into the end of said shaft 124, being provided with a semi-spherical end for the purpose. The gum enters under pressure and passes into the inclosed space formed by the disks 125, 127, from which it arrives in a groove 131 between the two disks. In order to prevent the gum or the like from being thrown off a porous ring 132 (Fig. 9) fills out the groove 131, which ring absorbs the gum and applies the same uniformly to the laps passed thereover. The wiper 133 is designed to wipe off the gum, which might collect on the circumference of the disk in the first construction. The grooved disk 76 arranged over or below the disks 125, 127 and driven from the shaft 124 by means of spur-wheels covers the circumference of the disks 125, 127, so that a lap passing between these two disks will be bent down against the gumming surface. Whereas the paper strip is fed to the transverse cutting device with uniform speed, the speed of rotation of the circular knives can be regulated by exchangeable spur-wheels 19 in such a manner that during each rotation and between the cutting periods a width of paper corresponding to the size of the paper bag to be made, passes between the rolls 8, 9 to the belts D, D¹. From the shaft 6 of the rolls 8, 9, which describe one revolution for each size of bag, are taken the vertical movements of the turning rolls or belts and the vertical motion of the folding rail S. In the construction shown in the drawing electromagnets 134, 135, connected in series, are provided for obtaining these vertical movements, but these movements can also be obtained by suitable eccentrics or the like.

Electric current supplied by the cable $k^1$ is conveyed by the brushes 136 to the insulated contact ring 137 on the shaft 6 and passes through the rail 7, which connects the distributing disks 138 (Figs. 5, 4), insulated on the shaft 6 and through the contact pins 140, elastically arranged on the disks 138 (Fig. 5), which pins are preferably made of carbon and bear against the inside surface of the rings 139, to these rings 139, which are adapted to be adjusted by means of the worms 141 and are each adapted to rotate in an insulating disk 142. The rings 139 are connected with the respective electro-magnets 134, 135 in series by a cable $k^2$. The current passes from the electro-magnets through a regulating resistance, not shown in the drawing, to the return cable. On the inside surface of the rings 139 there is a non-conducting layer 143, by which the electric current is interrupted in each revolution of the shaft 6. During this interruption, which takes place in connection with each ring 139 the blade S and rolls 71, 72 and 100, or 112, 113 and 118, which were pressed down when the current was flowing, are raised by springs 40, 70 and 99 into their top position, which operation is repeated for each blank.

What I claim and desire to secure by Letters Patent of the United States is:—

1. In a machine for making paper bags from a paper strip, the combination with the paper feeding, double blank cutting and folding devices, of a device to separate the parts of said double blank, comprising in combination, two transporting mechanisms arranged transversely to, and in the same horizontal plane with, the line of feed of said double blanks and moving in opposite directions, and means to feed said double blanks simultaneously between both said transporting means, substantially as and for the purpose set forth.

2. In a machine for making paper bags from a paper strip, the combination with the paper feeding, double blank cutting and folding devices, of a device to separate the parts of said double blanks, comprising in combination, two endless belts arranged transversely to the line of feed of said double blanks, rolls to carry and drive said belts in opposite directions, and means to press said double blanks simultaneously on both of said belts, substantially as and for the purpose set forth.

3. In a machine for making paper bags from a paper strip, the combination with the paper feeding, double blank cutting and folding devices, of a device to separate the parts of said double blanks, comprising in combination, two endless belts arranged transversely to the line of feed of said double blanks, rolls to carry and drive said belts in opposite directions, rolls adapted to reciprocate up and down over and to press said double blanks simultaneously on both said endless belts, and springs giving resiliency to said last mentioned rolls when pressing on said double blanks, substantially as and for the purpose set forth.

4. Machine for making paper bags from paper blanks, comprising in combination a device for cutting the blank in a staggered line parallel to the longitudinal middle with an oblique joining cut in the middle, a device for transversely cutting the blank in a staggered line with an oblique joining cut in the middle, and a device for folding the longitudinally and transversely cut blank across the middle oblique longitudinal joining cut, substantially as and for the purpose set forth.

5. In a machine for making paper bags from a paper strip, the combination with the paper feeding and double blank cutting devices, of a device to fold the double blanks, comprising in combination, a folding plate having a tightly closing slot, means to convey the double blanks to the middle of said folding plate, means to open the slot in said folding plate, a folding blade adapted to be moved into said slot when being opened, and a pair of endless belts arranged immediately underneath said folding plate, substantially as and for the purpose set forth.

6. In a machine for making paper bags from paper blanks, the combination with the device to turn around the edges of the blanks, of a device to apply an adhesive, comprising in combination, two disks arranged parallel to each other, a shaft carrying said disks and having a longitudinal channel, a spring to press said disks together, a porous ring arranged between said disks at the outer circumference, and means to guide the blanks over the porous ring, substantially as and for the purpose set forth.

7. In a machine for making paper bags from paper blanks, the combination with the device to turn around the edges of the blanks, of a device to apply an adhesive, comprising in combination, two disks arranged parallel to each other, a shaft carrying said disks and having a longitudinal channel, a spring to press said disks together, a porous ring arranged between said disks at the outer circumference, means to guide the blanks over the porous ring, and means to remove and take up the superfluous adhesive on the porous ring, substantially as and for the purpose set forth.

8. A machine for making paper bags from two paper blanks, comprising in combination, two pairs of endless belts adapted to convey the paper blanks in opposite directions, two pairs of endless belts disposed at an angle to said first pair, two stops to limit the movement of said paper blanks by said first pairs of endless belts, a pair of rolls working at an angle to each of said first pairs of endless belts, and provided at a point to which the paper blanks are brought by said first pairs of endless belts, and means to cause said rolls to approach and recede from each other, substantially as and for the purpose set forth.

In testimony whereof I have signed my name to this specification in the presence of two subscribing witnesses.

FRIEDRICH HEPP.

Witnesses:
WOLDEMAR HAUPT,
HENRY HASPER.